Figure 1:
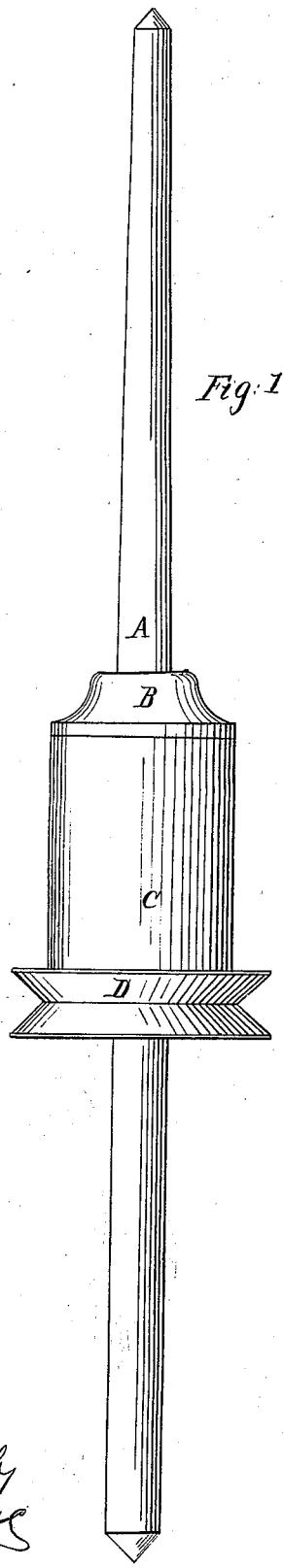

No. 77,566.

E. ATWOOD.
SPINDLE.

PATENTED MAY 5, 1868.

Witnesses:
J M Coombs
A Sellers

Inventor:
E. Atwood
per Brown Coombs
Atty

*The drawing in this pate is not in print.*

United States Patent Office.

EUGENE ATWOOD, OF MANSFIELD, CONNECTICUT.

Letters Patent No. 77,566, dated May 5, 1868.

---

IMPROVEMENT IN SPINDLES.

---

*The Schedule referred to in these Letters Patent and making part of the same.*

---

TO ALL WHOM IT MAY CONCERN:

Be it known that I, EUGENE ATWOOD, of Mansfield, in the county of Tolland, and State of Connecticut, have invented a new and useful Improvement in Spindles for spinning-frames, of which the following is a full, clear, and exact description, reference being had to the accompanying drawing, forming part of this specification, and in which—

Figure 2:
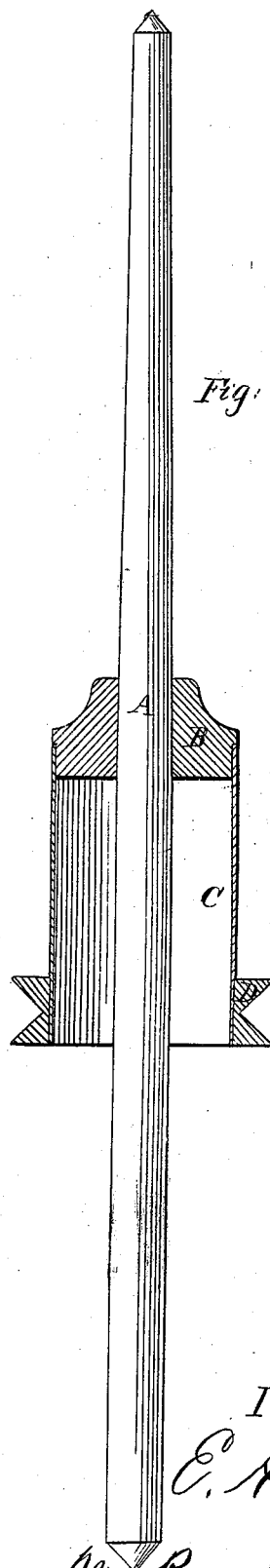

Figure 1 represents a longitudinal outside view or elevation of a spinning-frame spindle, with its whirr constructed in accordance with my invention, and Figure 2 a longitudinal section thereof.

This improvement relates to that description of spinning-frame spindles in which the whirr is upon a sleeve that projects upwards from it, surrounds the spindle, and is connected to the latter above the bolster or top bearing, by which lowered and outside position of the whirr, lateral strain upon the spindle, by the tension of the band upon the whirr, is prevented, general steadiness of action secured, and convenient means afforded, where desired, for the introduction of a self-lubricating device to the spindle, and its surrounding bolster, within the whirr-sleeve.

In previous constructions of this character, the whirr, sleeve, and head or cap that connects the sleeve, and through it the whirr, with the spindle, have been made in one piece, which makes it difficult to get a true hang of them on the spindle, though trued before securing the same on the spindle. This my invention obviates, and secures a true suspension or run of the whirr by making the head or cap, body or sleeve, and whirr, each of a separate piece, and first fitting on and securing to the spindle the head or cap, then fitting over the lower end of the cap, and uniting, by solder or otherwise, the upper end of a copper or other light tube, to form the sleeve, holding the same true, in relation to the spindle, while performing this operation, by means of a mandrel fitting over the spindle, and within the tube or sleeve, and afterwards uniting the whirr, by solder or otherwise, to the lower end of the sleeve.

Referring to the accompanying drawing, A represents the spindle proper, preferably of a taper form for its upper portion, and of a straight character for the remainder thereof. B is the head or cap, by which the whirr is connected, through the sleeve, to the spindle. This cap may be of wrought iron, and driven tight on the spindle, from its taper end to the proper point for suspension, through the sleeve, of the whirr, and afterwards, if necessary, suitably secured. I then put on the sleeve C, formed of a separate light tube or piece of tubing, which may be of wrought iron, copper, or other suitable material, and fit it true in relation to the spindle, and over the lower end of the cap, as a downward cylindrical projection therefrom, by holding it to its place while fitting and soldering or securing it to the cap, by or through a mandrel arranged to fit snugly over the spindle, and within the tube, as a filling thereto. On the lower end of the sleeve thus trued to its place, throughout its length, say by the spindle, in the course of the sleeve's attachment to the head or cap, after the latter has been secured to the spindle, I then fit and secure, by solder or otherwise, the whirr D.

This construction insures a true hang of the whirr, is lighter as a whole, and the device may be got up cheaper, considering the difficulty there is in securing a true hang or run of the sleeve and whirr, where made with the cap all in one piece, as the same is seldom or never true on first putting it on to the spindle, while the greatest accuracy, as regards truth, in such devices, is absolutely necessary.

What is here claimed, and desired to be secured by Letters Patent, is—

The combination, with the spindle A proper, of the head or cap B, tube or sleeve C, and whirr D, made separate and distinct from each other, and fitted and secured together for joint operation, substantially as shown and described.

EUGENE ATWOOD.

Witnesses:
J. R. ARNOLD,
W. G. MORRISON.